(12) United States Patent
Chandler et al.

(10) Patent No.: US 11,485,648 B2
(45) Date of Patent: Nov. 1, 2022

(54) FLUID TREATMENT MANAGEMENT SYSTEM

(71) Applicant: Datumpin, Inc., Ranch Cordova, CA (US)

(72) Inventors: Philip Colin Chandler, Bristol (GB); Darren Mark Brown, Gloucestershire (GB); Michael Sean Finney, Bristol (GB)

(73) Assignee: Datumpin, Inc., Ranch Cordova, CA (US)

( * ) Notice: Subject to any disclaimer, the term of this patent is extended or adjusted under 35 U.S.C. 154(b) by 0 days.

(21) Appl. No.: 16/733,602

(22) Filed: Jan. 3, 2020

(65) Prior Publication Data
US 2021/0206655 A1  Jul. 8, 2021

(51) Int. Cl.
*C02F 1/00* (2006.01)

(52) U.S. Cl.
CPC ........ *C02F 1/008* (2013.01); *C02F 2209/001* (2013.01); *C02F 2209/003* (2013.01); *C02F 2209/008* (2013.01); *C02F 2209/05* (2013.01); *C02F 2209/06* (2013.01); *C02F 2209/10* (2013.01); *C02F 2209/11* (2013.01); *C02F 2209/445* (2013.01)

(58) Field of Classification Search
None
See application file for complete search history.

(56) References Cited

U.S. PATENT DOCUMENTS

| | | | | |
|---|---|---|---|---|
| 6,146,524 A | * | 11/2000 | Story | C02F 1/78 210/199 |
| 2005/0139530 A1 | * | 6/2005 | Heiss | C02F 9/00 210/85 |
| 2006/0060512 A1 | * | 3/2006 | Astle | B01D 29/606 210/85 |
| 2010/0204924 A1 | * | 8/2010 | Wolfe | C02F 1/008 702/188 |

* cited by examiner

*Primary Examiner* — Richard C Gurtowski
(74) *Attorney, Agent, or Firm* — Winstead PC

(57) ABSTRACT

The present invention provides a method of managing operation of a point-of-use fluid treatment arrangement for providing treated fluid to at least one end user. The point-of-use fluid treatment arrangement comprises a fluid supply source provided by an operator, at least one fluid outlet for providing fluid to an end user, in which the at least one fluid outlet is in fluid communication with and spaced downstream from a point of supply of the fluid supply source, at least one point-of-use or point-of-entry fluid treatment device located at or adjacent a corresponding fluid outlet, and at least one communication unit.

15 Claims, 2 Drawing Sheets

FLUID TREATMENT MANAGEMENT SYSTEM

The present invention relates to a method and a fluid treatment management system for managing operation of a point-of-use or point-of-entry fluid treatment arrangement for providing treated fluid to at least one end user.

BACKGROUND OF INVENTION

In California, there are over 7,000 regulated drinking water systems. 45% of these drinking water systems are contaminated with contaminants such as nitrates, arsenic, hexavalent chromium, perchlorates and pesticides at levels in excess of limits imposed by Regulations (California State Water Resources Control Board, Division of Drinking Water (DDW) Title 22 Regulations for Public Health constituents). Regulations require water suppliers to provide centralized treatment of water to ensure that the water being supplied to end users is safe. It is however unaffordable for water suppliers to be able to provide centralized treatment for many community and non-transient water systems.

There is therefore a need for a reliable, economically viable, water treatment system which can ensure that a water supply is being treated efficiently to ensure safe water is delivered to end users.

SUMMARY OF INVENTION

According to a first aspect of the present invention there is provided a method of managing operation of a point-of-use or point-of-entry fluid treatment arrangement for providing treated fluid to at least one end user, wherein the point-of-use or point-of-entry fluid treatment arrangement comprises a fluid supply source provided by an operator, at least one fluid outlet for providing fluid to an end user, in which the at least one fluid outlet is in fluid communication with and spaced downstream from a point of supply of the fluid supply source, at least one point-of-use or point-of-entry fluid treatment device located at or adjacent a corresponding fluid outlet, and at least one communication unit, the method comprising:
receiving fluid quality information of the fluid supply source, the fluid quality information being obtained at or between the fluid supply source and a point of supply to the at least one fluid treatment device;
receiving fluid output flow measurements from at least one sensing module located at or adjacent one or more of: the at least one fluid treatment device and/or the at least one fluid outlets;
receiving fluid treatment properties of the at least one point-of-use or point-of-entry fluid treatment device;
calculating each individual service point of each point-of-use or point-of-entry fluid treatment device based on the fluid quality information of the fluid supply source, the fluid output flow measurements from a sensing module at or adjacent a corresponding fluid outlet, and the fluid treatment properties of the corresponding point-of-use or point-of-entry fluid treatment device; and
communicating each individual service point of the at least one point-of-use or point-of-entry fluid treatment device to at least one communication unit.

The present invention provides a reliable method for ensuring safe useable fluid is supplied to each outlet. The method of the present invention ensures that an operator can remotely and continuously monitor, in real-time:
the fluid qualities of the fluid supply being supplied to the fluid treatment arrangement;
The individual fluid treatment efficiencies based on the individual usage of the fluid supply by a user, together with the individual fluid treatment properties.

The individual service point of fluid treatment device fluid treatment device may be indicative of the time at which the fluid treatment device needs servicing, for example by cleaning, prior to further use of the fluid treatment device. The fluid treatment device may be operable for self cleaning.

The individual service point may in addition or in the alternative be indicative of the failure point of the fluid treatment device. The failure point may be the point in time where the fluid treatment device fails to treat the fluid efficiently.

The method and system of the present invention is operable to predict the service point, and optionally the failure point, of the or each fluid treatment device in order to ensure that the system (and in particular the fluid treatment device (s)) is operating within predetermined criteria to ensure that fluid provided to the user by the system is suitable for use.

The method therefore enables an operator to ensure that the arrangement is operating effectively and thereby minimizes, preferably removes, the risk of unsafe fluid being supplied to an end user.

The term "point-of-use or point-of-entry" is used herein to refer to a location at where the fluid is used, i.e. the point at where the fluid exits the fluid outlet.

The term "point of supply" is used herein to refer to a location along the fluid pathway between or at the fluid supply source and before the point at which the fluid pathway splits to deliver fluid to each fluid outlet.

The point of supply and the point-of-use are spaced apart from each other. The point-of-use or point-of-entry is downstream from the point of supply. In one embodiment, the point of supply is at or adjacent the fluid supply source, and the point-of-use or point-of-entry is at or within a property boundary, for example a residential, commercial or industrial property. In one embodiment, the point-of-entry is at or adjacent a property boundary.

In one embodiment, the fluid treatment arrangement comprises a fluid supply source in communication with a plurality of fluid outlets, each outlet being located at a different location, for example within separate residential, commercial or industrial properties.

In one embodiment, the fluid treatment arrangement comprises a fluid pathway extending from the fluid supply source towards each fluid outlet. In one embodiment, the fluid pathway comprises a first fluid pathway extending from the fluid supply source towards the plurality of outlets. The first fluid pathway extends from the fluid supply source to a point of separation at which the fluid pathway branches or separates into a plurality of second fluid pathways. Each second fluid pathway extends from the point of separation to a corresponding fluid outlet. In one embodiment, the point of separation may be at or adjacent a property boundary.

The point of supply is preferably located at the fluid supply source, or at the point of separation, or between the fluid supply source and the point of separation of the fluid pathway, i.e. the location at which the fluid pathway from the supply source towards each outlet branches or separates to provide a plurality of separate fluid pathways, each configured to be in communication with a corresponding outlet.

The term "fluid quality information" is used herein to refer to properties of the fluid which are indicative of the quality of the fluid. In one embodiment, the fluid quality information comprises at least one of: information about the type(s) of fluid contaminants in the fluid supply source, concentrations of the fluid contaminants, pH of the fluid supply source, hardness of the fluid, turbidity of the fluid supply source, total suspended solids (TSS), total dissolved solids (TDS) in the fluid supply source, and any combination thereof. In one embodiment, the fluid quality information comprises fluid contamination concentrations.

In one embodiment, the fluid contamination concentrations comprise one or more of: nitrate concentrations, nitrite concentrations, perchlorate concentrations, and/or arsenic concentrations.

A fluid treatment device is used to remove contaminants from a fluid using one or more of: a physical barrier, such as for example fine physical barrier (such as for example a filter, a sieve or screen), a chemical process, or a biological process.

The term "fluid treatment properties" is used herein to refer to the properties of the fluid treatment device which define the efficiency of the fluid treatment, for example the efficiency of the fluid treatment device to treat or purify the fluid, for example the efficiency of the fluid treatment device to remove contaminants from the fluid. In one embodiment, the fluid treatment properties include the efficiency of the fluid treatment device for treating hardness of the fluid.

In one embodiment, the fluid treatment properties of the at least one fluid treatment device comprise at least one of: type of fluid treatment agents employed in the fluid treatment device, arrangement of the fluid treatment agents in the fluid treatment device, life expectancy of the fluid treatment device, or any combination thereof.

Examples of suitable point-of-use or point-of-entry fluid treatment device for use in the fluid treatment arrangement include, but are not limited to, one or more of: sieve, screen, ion exchange columns, granular-activated carbon (GAC) filters, metallic alloy filters, microporous ceramic filters, carbon block resin (CBR) filters, microfiltration membranes, ultrafiltration membranes. In one embodiment, the at least one fluid treatment device may comprise a multi-barrier filter system.

The term "service point" is used herein to refer to a point in time at which the fluid treatment efficiency of a corresponding fluid treatment device reaches a minimum threshold level. In one embodiment, each individual service point corresponds to a predetermined minimum fluid treatment performance level of the corresponding fluid treatment device. In one embodiment, the predetermined minimum fluid treatment performance level (minimum threshold level) is determined by the original manufacturer certified technical publications. In one embodiment, the predetermined minimum fluid treatment performance level (minimum threshold level) is determined by the operator. The minimum threshold level may be any suitable percentage of the original fluid treatment efficiency of a new, unused fluid treatment device, depending on the requirements for the fluid treatment device. For example, the minimum threshold level may be 60%, preferably 50%, preferably 40%, preferably 30%, preferably 20%, for example about 10% of the original fluid treatment efficiency of a new, unused fluid treatment device depending on applicable regulations, legislations and standards.

In one embodiment, the fluid treatment performance of the or each fluid treatment device is indicative of at least one of: remaining effective life of the fluid treatment device, and/or degree of fluid treatment provided by the corresponding fluid treatment device.

In one embodiment, calculating each individual service point comprises determining one or more of: the remaining fluid treatment capacity of each of the at least one point-of-use or point-of-entry fluid treatment device and/or the rate of loss of fluid treatment efficiency of each of the at least one point-of-use or point-of-entry fluid treatment device and/or the operational lifetime impact of constituents within the fluid on each of the at least one point-of-use or point-of-entry fluid treatment devices.

In one embodiment, the communication unit is at least one computing device, such as for example a computer, a laptop, or mobile phone, operable by one or more of: the operator and/or the or each end user.

In one embodiment, the method further comprises communicating a first alert signal to the at least one communication unit, the first alert signal being indicative that a fluid treatment device is approaching its individual service point. The first alert signal may be one or more of: visible and/or audible.

The first alert signal provides the user with a visual and/or audible indication that a corresponding fluid treatment device needs to be serviced. The method of the present invention enables an operator and/or an end user to be notified by the first alert signal when a fluid treatment device is approaching its service point, and is therefore considered to no longer be efficiently treating the supplied fluid. The first alert signal therefore serves as a reminder to the operator and/or an end user that the corresponding fluid treatment device will need servicing and/or changing within a following predetermined time period, or in some embodiments needs changing immediately.

In one embodiment, the first alert signal may be configured to communicate with the communication unit(s) at a predetermined time period in advance of the calculated service point of the corresponding fluid treatment device. This predetermined time period may be a warning period prior to the calculated service point of the corresponding fluid treatment device, thereby providing the operator and/or end user with a time period, during which the corresponding fluid treatment device is still functioning above the minimum fluid treatment performance level, for obtaining and replacing the corresponding fluid treatment device prior to fluid treatment device failure. The predetermined time period may be adjustable by one or more of the operator and/or user. Preferably, the predetermined time period is adjustable by the operator.

The first alert signal may be operable to communicate with the communication unit(s) at repeated time intervals within the predetermined time period prior to the service point of the corresponding fluid treatment device to provide a repeating reminder that a corresponding fluid treatment device needs to be serviced and/or changed.

In one embodiment, the method comprises collecting a historic fluid treatment performance data record for each point-of-use or point-of-entry fluid output. The historic fluid treatment performance data record may comprise one or more of: fluid quality information and/or fluid output flow measurements at the corresponding point-of-use or point-of-entry fluid output; and calculating each individual service point of the at least one fluid treatment device based on the corresponding historic fluid treatment performance data record.

In one embodiment, the method further comprises communicating a second alert signal to the at least one communication unit. The second alert signal may be indicative of one or more of: a concentration of one or more fluid contaminants, and/or the pH of the fluid supply source, the conductivity of the fluid treatment device output, and/or the turbidity of the fluid supply source, and/or the total dissolved solids within the fluid supply source, and/or the total suspended solids within the fluid supply source, having reached a predetermined maximum threshold value.

In one embodiment, the method further comprises communicating a third alert signal to the at least one communication unit, the third alert signal being indicative of the presence of at least one detrimental constituent within the fluid.

In one embodiment, the at least one detrimental constituent is selected from one or more of: iron and/or excessive chlorination concentrations.

The second alert signal and/or third alert signal may therefore communicate with the at least one communication unit to provide a warning to the operator and/or end user that the fluid supply source to the fluid treatment device is unsafe and should no longer be supplied to and/or should not be used by the end user.

In one embodiment, the method further comprises communicating a fourth alert signal to the at least one communication unit, the fourth alert signal being indicative that one or more of: fluid quality information of the fluid supply source and/or fluid output flow measurements have not been received, and/or that there is an error in the information received. The fourth alert signal may be one or more of: visible and/or audible.

In one embodiment, the method comprises continuously receiving information in the form of one or more of: fluid quality information of the fluid supply source, and/or continuously receiving fluid output flow measurements; and/or continuously receiving fluid treatment properties of the at least one point-of-use or point-of-entry fluid treatment device. In one embodiment, the method further comprises periodically receiving information from the at least one communication unit. In one embodiment, the method further comprises correlating the continuously received information with the corresponding periodically received information, for example one or more of: fluid quality information of the fluid supply source, and/or fluid output flow measurements; and/or fluid treatment properties of the at least one point-of-use or point-of-entry fluid treatment device, received from the at least one communication unit, for example input by the operator and/or user. In one embodiment, the method further comprises communicating the fourth alert signal to the at least one communication unit indicative that there is an error in the information received, for example indicative that the continuously received information is significantly different to the corresponding operator and/or user input information.

The fourth signal may therefore communicate with the at least one communication unit to provide a warning to the operator that the system has not received all necessary information and/or measurements, and/or has received contradictory information and/or measurements, in order to determine the service point of the at least one corresponding fluid treatment device, and as such the fluid may be unsafe and should no longer be supplied to and/or should not be used by the end user until the missing information and/or measurements are received.

In one embodiment, the method further comprises communicating a fifth alert signal to the at least one communication unit, the fifth alert signal being indicative that there has been a power failure associated with one or more components of the system. The fifth alert signal may be one or more of: visible and/or audible.

The fifth signal may therefore communicate with the at least one communication unit to provide a warning to the operator that the system has experienced a power cut, and as such the fluid may be unsafe and should no longer be supplied to and/or should not be used by the end user until the missing information and/or measurements are received.

In one embodiment, the method further comprises restricting fluid supply to and/or diverting fluid supply away from a corresponding point-of-use or point-of-entry fluid treatment device and/or at least one fluid outlet when the service point (and/or failure point) of the corresponding fluid treatment device is reached. For example, the method may further comprise restricting fluid supply to and/or diverting fluid supply away from a corresponding at least one fluid treatment device and/or at least one fluid outlet on activation of one or more of the first, second, third, fourth or fifth alerts.

The present invention therefore ensures that the fluid treatment arrangement only delivers safe fluid to each of the outlet(s). The present invention in some embodiments ensures that once a fluid treatment device has reached its individual service point, no further fluid is supplied from the fluid source to the corresponding outlet. The present invention therefore reduces, and preferably eliminates the risk, of a fluid treatment arrangement delivering unsafe, poorly treated fluid, through an outlet to an end user.

In one embodiment, the fluid quality information is received at periodic intervals. In one embodiment, the frequency at which the fluid quality information is received may be adjusted or selected in order to meet requirements for the fluid treatment arrangement. In one embodiment, the frequency at which the fluid quality information is received may be adjusted by the operator. In one embodiment, the fluid quality information is continuously monitored.

In one embodiment, the arrangement may comprise a plurality of fluid treatment devices. In one embodiment, fluid may be supplied to pass sequentially through a series of fluid treatment devices prior to passing through the corresponding outlet. In one embodiment, the method comprises receiving fluid treatment properties of each fluid treatment device within a plurality of fluid treatment devices associated with a corresponding outlet, in which the plurality of fluid treatment devices are arranged in series to enable fluid to pass sequentially therethrough prior to reaching the outlet. The plurality of fluid treatment devices may comprise a first fluid treatment device configured to treat or remove a first contaminant present within the fluid, and at least a second fluid treatment device configured to treat or remove at least a second contaminant present within the fluid. The first and at least a second contaminants are preferably different. It is however envisaged that the first and at least a second contaminants could be the same to ensure optimum purification of the fluid. For example, the first fluid treatment device may be configured to remove arsenic within the fluid, and the second fluid treatment device may be configured to remove nitrates within the fluid.

The fluid may be suitable for use in a domestic or commercial or agricultural or industrial environment. In one embodiment, the fluid is water, for example water for use, such as consumption, by a human.

According to a second aspect of the present invention there is provided a fluid treatment management system for managing a fluid treatment arrangement comprising: a fluid supply source provided by an operator, at least one fluid outlet in fluid communication with and spaced downstream of the fluid supply source, in which the or each point of use fluid outlet provides fluid to an end user, and at least one point-of-use or point-of-entry fluid treatment device located at or adjacent a corresponding point-of-use fluid outlet, the system comprising:

at least one first sensing module located at a location at or between the fluid supply source and the point of supply of the fluid supply source, wherein the first sensing module is operable to obtain fluid quality information of the fluid supply source;

at least one second sensing module, wherein the or each second sensing module is located at or adjacent one or more of: at least one fluid treatment device and/or at least one fluid outlet, wherein the or each second sensing module is operable to obtain fluid output flow measurements of a corresponding fluid outlet;

a server arrangement communicably coupled to the first and at least one second sensing modules, wherein the server arrangement is operable to calculate the or each individual service point of the at least one point-of-use or point-of-entry fluid treatment device based on the fluid quality information of the fluid supply source provided by the first sensing module, the fluid output flow measurements of at a corresponding point of use fluid output provided by the second sensing module(s), and the fluid treatment properties of the corresponding fluid treatment device; and at least one communication unit operable to communicate each individual predicted service point of the at least one fluid treatment device to one or more of: the operator and/or the or each end user.

In one embodiment, the communication unit is at least one computing device (such as for example a laptop, mobile phone or computer) operable by one or more of: the operator and/or the or each end user.

In one embodiment, the server arrangement comprises a first alert mechanism operable to communicate a first alert signal to the at least one communication unit, the first alert signal being indicative that a fluid treatment device is approaching its individual predicted service point.

In one embodiment, the fluid treatment management system further comprises a prediction module operable to predict service points (and/or failure points) of the at least one of the plurality of fluid treatment devices based on a record of collected historic fluid treatment performance data.

In one embodiment, the prediction module employs machine learning, edge processing or AI algorithms.

In one embodiment, the server arrangement is operable to receive information relating to the fluid contamination concentrations at periodic intervals. In one embodiment, the server arrangement is operable to receive information relating to the fluid contamination concentrations continuously.

In one embodiment, the server arrangement comprises a second alert mechanism operable to further communicate a second alert signal to the at least one communication unit, the second alert signal being indicative that a fluid contamination level exceeds a predetermined maximum threshold fluid contamination level.

In one embodiment, the server arrangement comprises a third alert mechanism operable to further communicate a third alert signal to the at least one communication unit, the third alert signal being indicative of the presence of at least one detrimental constituent within the fluid.

In one embodiment, the server arrangement comprises a fourth alert mechanism operable to further communicate a fourth alert signal to the at least one communication unit, the fourth alert signal being indicative of one or more of: fluid quality information of the fluid supply source not being obtained by the first sensing module and/or output flow measurements not being reobtained by the second sensing module and/or errors in information being obtained.

In one embodiment, the server arrangement is operable to receive continuous information in the form of one or more of: fluid quality information of the fluid supply source, and/or continuously receiving fluid output flow measurements; and/or continuously receiving fluid treatment properties of the at least one point-of-use or point-of-entry fluid treatment device. In one embodiment, the server arrangement is operable to receive information periodically from the at least one communication unit, such information relating to one or more of: fluid quality information of the fluid supply source, and/or fluid output flow measurements; and/or fluid treatment properties of the at least one point-of-use or point-of-entry fluid treatment device. In one embodiment, the server arrangement is operable to correlate the continuous information received with the corresponding periodically received information received from the at least one communication unit. In one embodiment, the fourth alert mechanism is operable communicate a fourth alert signal to the at least one communication unit indicative that the continuously received information is significantly different to the corresponding periodically received information from the at least one communication unit.

In one embodiment, the server arrangement comprises a fifth alert mechanism operable to communicate a fifth alert signal to the at least one communication unit, the fifth signal being indicative of one or more of: a power cut and/or one or more sensor module failure.

In one embodiment, the fluid treatment management system further comprises at least one control module, in which each control module is in communication with the server arrangement and a corresponding at least one fluid outlet, in which the server arrangement is operable to activate a control module order to restrict fluid supply to and/or to divert fluid supply away from a corresponding point-of-use or point-of-entry fluid outlet when the corresponding predicted service point of the corresponding fluid treatment device has been reached.

In one embodiment, the fluid treatment management system further comprises at least one control module, in which each control module is in communication with the server arrangement and a corresponding at least one fluid outlet, in which the server arrangement is operable to activate a control module order to restrict fluid supply to and/or to divert fluid supply away from a corresponding point-of-use or point-of-entry fluid outlet when one or more of the first, second, third, fourth or fifth alert signals have been activated.

Whilst the invention has been described above, it extends to any inventive combination of the features set out above or in the following description or drawings.

BRIEF DESCRIPTION OF THE DRAWINGS

In order that the present invention may be more readily understood, embodiments of the invention will now be described by way of example, with reference to the accompanying drawings, in which.

DETAILED DESCRIPTION

Figure 1:
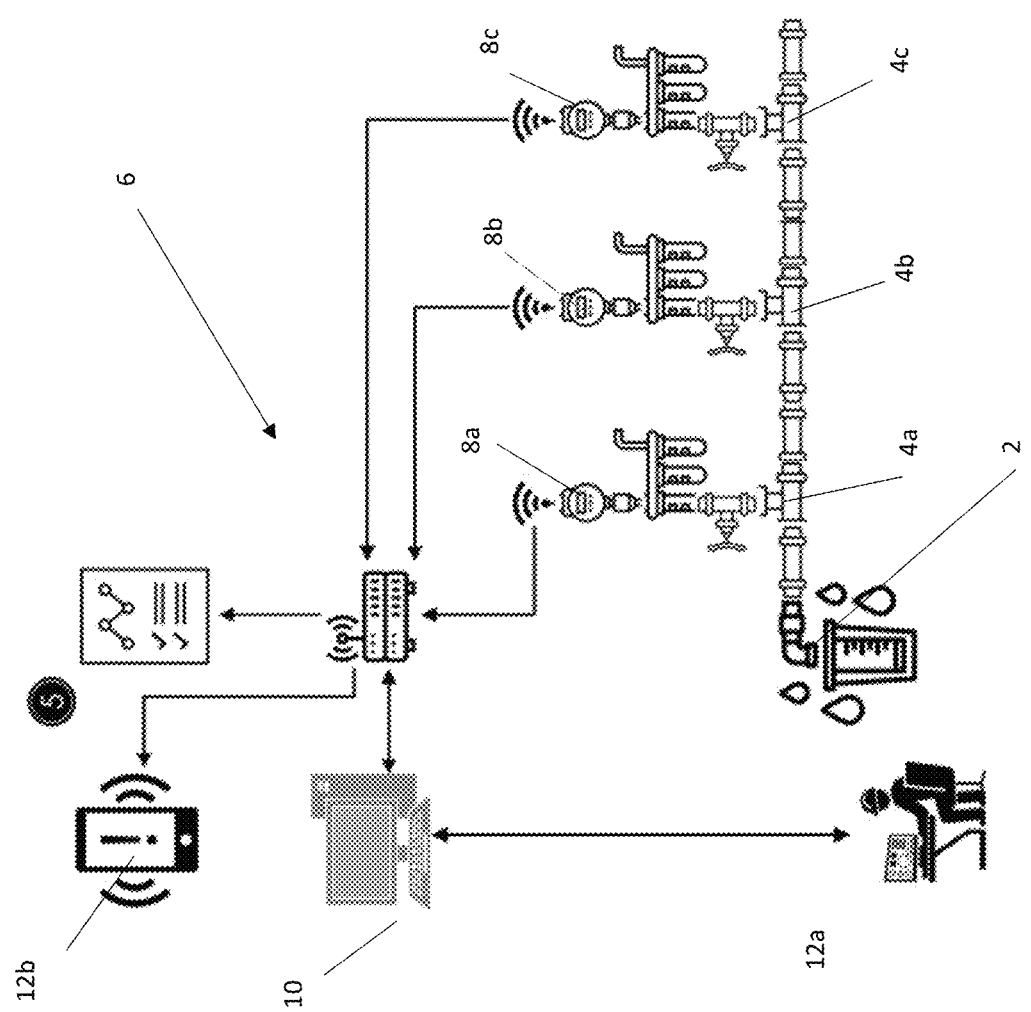
FIG. 1 is a schematic illustration of the fluid treatment management system according to one embodiment of the present invention.

With reference to FIG. 1, the fluid treatment arrangement comprises: a fluid supply source provided by an operator (not shown), and a fluid outlet 2 in fluid communication with and spaced downstream from the fluid supply source. Although the illustrated embodiment shows a single fluid outlet 2, it is to be understood that the arrangement may comprises a plurality of fluid outlets. Each outlet would be in fluid communication with and spaced downstream from the fluid supply source. The fluid outlet 2 provides fluid to an end user.

The fluid supply source is provided at a distinct separate location to the outlet. The fluid supply source and outlet may be separated from each other by a significant distance, for example by at least 1 metre, preferably at least 5 metres, preferably at least 20 metres, for example at least about 100 metres. The fluid outlet is preferably provided within a domestic, corporate or industrial environment. The point of supply is located external to the environment within which the fluid outlet is located, for example external to the domestic, corporate or industrial environment within which the outlet is provided.

A fluid pathway extends between the fluid supply source and the outlet 2. In some embodiments, the arrangement may comprise a plurality of outlets, and as such the fluid pathway may comprise a first fluid pathway extending between the fluid supply source and a point of separation, and a plurality of second pathways, each second pathway extending between the point of separation and a corresponding outlet. The point of supply is spaced apart from and located upstream from the fluid outlet(s). Preferably the point of supply is located at or between the point of separation and the fluid supply source.

The fluid treatment arrangement further comprises a series of three point-of-use or point-of-entry fluid treatment devices 4a, 4b, 4c. Although the illustrated embodiment shows a series comprising three fluid treatment devices, it is to be understood that the series could contain any suitable number of fluid treatment devices with any suitable properties, for example the arrangement may comprise a single outlet, a pair of outlets, or more than three outlets.

Each fluid treatment device 4a, 4b, 4c is located between the point of supply from the fluid supply source and the corresponding fluid outlet 2. Each fluid treatment device 4a, 4b, 4c is configured to remove a different contaminant from the fluid. A first fluid treatment device 4a is configured to remove a first contaminant, such as for example arsenic, from the fluid; a second fluid treatment device 4b is configured to remove a second contaminant, such as for example nitrates, from the fluid; and a third fluid treatment device is configured to remove a third contaminant, for example nitrites, from the fluid. It is however envisaged that the fluid treatment devices may be configured to remove the same contaminant to ensure a higher degree of purification of the fluid. It is also to be understood that the arrangement may comprise any number of fluid treatment devices in association with the or each corresponding outlet. For example, the arrangement may comprise a single fluid treatment device, a pair of fluid treatment devices in series, or a plurality of fluid treatment devices in series.

The fluid treatment management system 6 comprises a first sensing module (not shown) located adjacent the point of supply (not shown) of the fluid supply source. The first sensing module is operable to obtain fluid quality information of the fluid supply source at the point of supply. It is to be understood that the first sensing module may be operable to obtain fluid quality information of the fluid supply source at any location at or between the fluid supply source and the point of supply.

The fluid treatment management system 6 further comprises three second sensing modules 8a, 8b, 8c. Each second sensing module 8a, 8b, 8c is located adjacent a corresponding fluid treatment device 4a, 4b, 4c. Each second sensing module is operable to obtain fluid output flow measurements through the corresponding fluid treatment device.

The fluid treatment management system 6 further comprises a server arrangement 10 communicably coupled (by any suitable technology such as Bluetooth) to the first and second sensing modules 8a, 8b, 8c. The server arrangement 10 is operable to calculate each individual service point of each of the three fluid treatment devices 4a, 4b, 4c. The server arrangement 10 is able to calculate the individual service point of a fluid treatment device based on the fluid quality information of the fluid supply source provided by the first sensing module, the fluid output flow measurements of the outlet 2 associated with that particular fluid treatment device 4a, 4b, 4c, and the fluid treatment properties of the corresponding fluid treatment device 4a, 4b, 4c.

The service point may be considered to refer to a point in time at which the fluid treatment efficiency of a corresponding fluid treatment device reaches a minimum threshold level. The minimum threshold level may be preselected by the operator and/or end user.

The system 6 therefore provides a predictive system (i.e. one that is capable of predicting the lifespan of a fluid treatment device based on fluid treatment properties and individual usage by the end user) rather than a reactive system (i.e. one that indicates failure of a fluid treatment device once it has failed).

The fluid treatment management system 6 further comprises a first communication unit 12a in communication with an operator, and a second communication unit 12b in communication with an fluid treatment devices user to communicate each individual predicted service point of the fluid treatment devices 4a, 4b, 4c. The first and second communication units 12a, 12b may be any suitable device, such as for example mobile phones, laptops, tablets etc.

The first communication unit 12a may be in communication with the server arrangement 10 so that the operator can input system 6 requirements and/or parameters. For example, the operator may use the first communication unit 12a to set or adjust the frequency with which measurements are received from the first and second sensing modules.

The fluid treatment management system 6 further comprises a remote data output 14 for machine learning, edge computing or AI. The remote data output 14 may record and store historic fluid treatment performance data records for each fluid output, the historic fluid treatment performance data record comprising one or more of: fluid quality information obtained at the point of supply, and/or fluid output flow measurements at the corresponding fluid output; and calculating each individual service point of the at least one point-of-use or point-of-entry fluid treatment device based on the corresponding historic fluid treatment performance data record.

The system further comprises a first alert mechanism operable to communicate a first alert signal to the communication unit 12a, 12b indicative of a corresponding fluid treatment device 4a, 4b, 4c is approaching its individual service point. The first alert mechanism may be alerted at a predetermined time period in advance of the individual service point.

The system further comprises a second alert mechanism operable to communicate a second alert signal to the communication unit 12a, 12b indicative of one or more of: a concentration of one or more fluid contaminants, and/or the pH of the fluid supply source, and/or the turbidity of the fluid supply source, and/or the total dissolved solids within the fluid supply source, and/or the total suspended solids within the fluid supply source, has reached a predetermined maximum threshold value.

Figure 2:
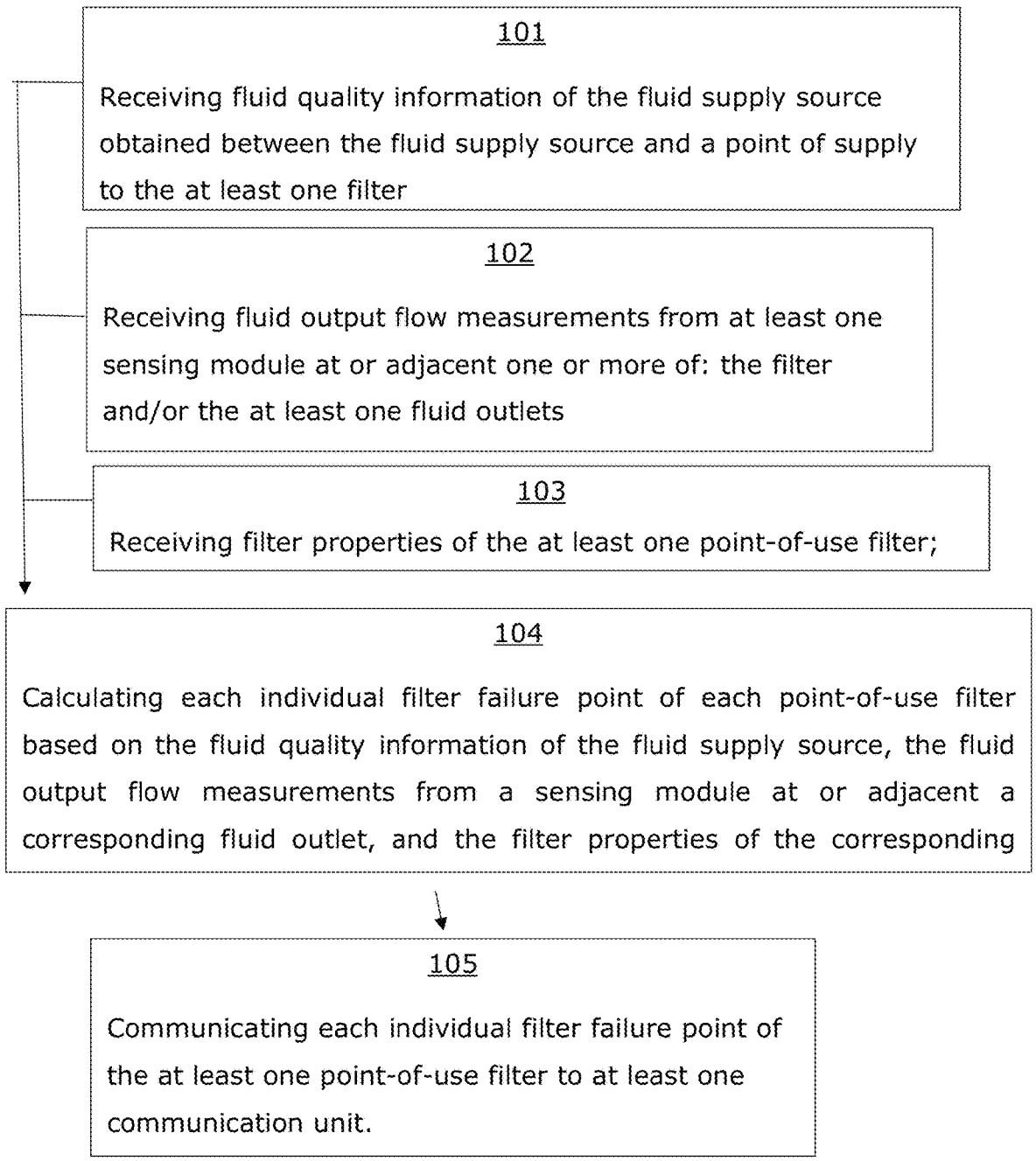
FIG. 2 is a flowchart of the method of managing operation of a point-of-use or point-of-entry fluid treatment arrangement for providing treated fluid to at least one end user according to one embodiment of the present invention.

The system further comprises a third alert mechanism operable to communicate a third alert signal to the communication unit 12a, 12b indicative of the presence of at least one detrimental constituent within the fluid With reference to FIG. 2, in use, the fluid treatment management system 6 is used to monitor a point-of-use fluid treatment arrangement for providing treated fluid to at least one end user. The method of using the system 6 comprises providing a fluid from the fluid supply source to the fluid pathway extending from the fluid supply source to the outlet 2. The fluid passes from the fluid supply source, through each of the three vs 4a, 4b, 4c in the series prior to being provided at outlet 2 to the end user.

An operator may utilize the system of the present invention to ensure that the arrangement is continuously delivering safe fluid to the end user. The operator may in one embodiment be a fluid supply company, such as for example a water supply company. The fluid supply company may be responsible for the fluid supply source.

The system 6 receives fluid quality information of the fluid supply source 101 obtained at or between the fluid supply source and a point of supply to each of the three fluid treatment devices 4a, 4b, 4c. The fluid quality information is received at a located spaced apart from and upstream of the fluid treatment device(s)/outlet(s).

The fluid quality information may contain any information relating to the quality of the fluid supply source, such as one or more of: fluid contamination concentrations, such as for example one or more of: nitrate concentrations, nitrite concentrations, perchlorate concentrations, and/or arsenic concentrations; type(s) of fluid contaminants in the fluid supply source; pH of the fluid supply source; turbidity of the fluid supply source; total suspended solids (TSS) and/or total dissolved solids (TDS) in the fluid supply source, and any combination thereof. The fluid quality information may be obtained from a sensing module or from data produced from manual assessments of the fluid supply source.

The system 6 receives fluid output flow measurements 102 of the fluid from three sensing modules 8a, 8b, 8c, each located at or adjacent a corresponding fluid treatment device 4a, 4b, 4c.

The system 6 receives fluid treatment properties 103 of each fluid treatment device 4a, 4b, 4c.

The fluid quality information and/or fluid output flow measurements and/or fluid treatment properties may be inputted into either (or both) of the first and second communication units 12a, 12b by the operator and/or end user.

The system 6 calculates each individual service point 104 of each point-of-use or point-of-entry fluid treatment device 4a, 4b, 4c based on the fluid quality information of the fluid supply source, the fluid output flow measurements from a sensing module at or adjacent a corresponding fluid outlet, and the fluid treatment properties of the corresponding point-of-use or point-of-entry fluid treatment device. Calculating each individual service point comprises determining one or more of: the remaining fluid treatment capacity of each of the at least one point-of-use or point-of-entry fluid treatment device and/or operational lifetime impact of constituents within the fluid on each of the at least one point-of-use or point-of-entry fluid treatment devices. The system uses this information to calculate, or predict, the point at which the fluid treatment efficiency of a corresponding fluid treatment device will reach a minimum predetermined threshold level (i.e. the point of failure of the fluid treatment device).

The calculated individual service point of each fluid treatment device 4a, 4b, 4c is then communicated 105 to one or more, preferably both, of the first and second communication units 12a, 12b. The communication units 12a, 12b may be computing devices, such as for example mobile phones, computers, laptops or tablet. The system therefore is able to accurately notify the end user and operator of the predicted service lifespan of each fluid treatment device dependent on each individual usage of the fluid treatment device.

The first alert mechanism of the system is triggered at a predetermined time period prior to the service point of a fluid treatment device. The first alert mechanism once triggered provides an audible and/or visual warning to at least one of the operator and/or end user of the decline in efficiency of the fluid treatment device to a predetermined minimum threshold value in advance of complete failure of the fluid treatment device. The first alert mechanism thereby ensures that the operator and/or end user are aware of the need to change the fluid treatment device prior to complete failure of the fluid treatment device. The system therefore provides sufficient warning of the decline of the fluid treatment device's efficiency to ensure the fluid treatment device is replaced prior to complete failure of the fluid treatment device.

If the user fails to replace one or more of the fluid treatment devices 4a, 4b, 4c within a predetermined time period before the calculated individual service point as determined by the system 6, the system 6 triggers a further first alert signal to one or both communication units 12a, 12b. In a first instance, the first alert signal may be sent to the communication unit accessible by the end user to provide a reminder of the need to urgently replace the corresponding fluid treatment device. Failure to act on the first alert signal and to change the fluid treatment device may trigger the system to communicate a further first alert signal to the communication unit 12a accessible by the operator.

If the user fails to replace one or more of the fluid treatment devices 4a, 4b, 4c within a time period before the calculated individual service point as determined by the system 6, the system may restrict fluid supply to and/or divert fluid supply away from the corresponding outlet as a precaution to ensure that unsafe fluid is not supplied to the end user. The operator may be notified by the system that the fluid treatment device has not been changed, and the operator may take steps to restrict and/or divert fluid away from the corresponding fluid treatment device.

The system also communicate a second alert signal (one or more of an audible and/or visual signal) to one or more, preferably each, communication unit 12a, 12b to alert the user and/or operator that a predetermined threshold level of one or more of: a concentration of one or more fluid contaminants, and/or the pH of the fluid supply source, and/or the turbidity of the fluid supply source, and/or the total dissolved solids within the fluid supply source, and/or the total suspended solids within the fluid supply source, has been reached.

The system may communicate a third alert signal to one or more, preferably each, of the communication units 12a, 12b to alert the user and/or operator to the presence of at least one detrimental constituent within the fluid.

The second and/or third alert signals each therefore provide immediate notification that the fluid being supplied to the end user is considered to be unsafe. As a result, the user will be aware that the fluid should not be used.

Furthermore, on communication of the second and/or third alert signals, the system may restrict fluid supply to and/or divert fluid supply away from the corresponding outlet as a precaution to ensure that unsafe fluid is not supplied to the end user.

The method also comprises collecting a historic fluid treatment performance data record for each fluid output 2. The historic fluid treatment performance data record comprising one or more of: fluid quality information obtained at the point of supply, and/or fluid output flow measurements at the corresponding fluid output; and calculating each individual service point of the at least one point-of-use or point-of-entry fluid treatment device based on the corresponding historic fluid treatment performance data record.

Although the illustrated embodiment relates to the purification and treatment of water, and in particular to domestic water supplies, it is to be understood that the fluid could be any suitable fluid, including liquids and gases, and is not to be limited to use with water.

What is claimed is:

1. A method of managing operation and service provision of a point-of-use or point-of-entry fluid treatment arrangement for providing treated fluid to at least one end user, wherein the point-of-use or point-of-entry fluid treatment arrangement comprises a fluid supply source provided by an operator, at least one fluid outlet for providing fluid to an end user, in which the at least one fluid outlet is in fluid communication with and spaced downstream from a point of supply of the fluid supply source, at least two point-of-use or point-of-entry fluid treatment devices located at or adjacent a corresponding fluid outlet, the first fluid treatment device being configured to remove a first contaminant from the fluid and the second fluid treatment device being configured to remove a second contaminant, the first and second contaminants selected from the group consisting of arsenic, nitrates, and nitrites, at least one control module in communication with a server arrangement and a corresponding at least one fluid outlet, and at least one communication unit, the method comprising:
receiving fluid quality information of the fluid supply source obtained at a location between the fluid supply source and a point of supply to the at least one fluid treatment device;
receiving fluid output flow measurements from at least one sensing module at or adjacent one or more of: at least one fluid treatment device and/or the at least one fluid outlets;
receiving fluid treatment properties of the at least one point-of-use or point-of-entry fluid treatment device;
calculating each individual service point of each point-of-use or point-of-entry fluid treatment device based on the fluid quality information of the fluid supply source, the fluid output flow measurements from a sensing module at or adjacent a corresponding fluid outlet, and the fluid treatment properties of the corresponding point-of use or point-of-entry fluid treatment device, in which calculating each individual service point comprises determining a rate of loss of fluid treatment efficiency of each of the at least one point-of-use or point-of-entry fluid treatment device and an operational lifetime impact of constituents within the fluid on each of the at least one point-of-use or point-of-entry fluid treatment devices;
activating the at least one control module to restrict fluid supply to, or to divert fluid supply away from, a corresponding point-of-use or point-of-entry fluid outlet when a predicted service point of the corresponding fluid treatment device has been reached; and
communicating each individual service point of the at least one point-of-use or point-of-entry fluid treatment device to at least one communication unit.

2. The method of claim 1, in which calculating each individual service point comprises determining remaining fluid treatment capacity of each of the at least one point-of-use or point-of-entry fluid treatment device.

3. The method of claim 1, wherein the method further comprises communicating a first alert signal to the at least one communication unit, the first alert signal being indicative that a fluid treatment device is approaching its individual service point.

4. The method of claim 1, wherein the method further comprises restricting fluid supply to and/or diverting fluid supply away from the corresponding point-of-use or point-of-entry fluid treatment device and/or fluid outlet when the service point of the corresponding fluid treatment device is reached.

5. The method of claim 1, wherein the method comprises collecting a historic fluid treatment performance data record for each fluid output, the historic fluid treatment performance data record comprising one or more of: fluid quality information obtained at the point of supply, and/or fluid output flow measurements at the corresponding fluid output; and calculating each individual service point of the at least one point-of-use or entry fluid treatment device based on the corresponding historic fluid treatment performance data record.

6. The method of claim 1, wherein the fluid quality information comprises fluid contamination concentrations.

7. The method of claim 1, wherein the fluid quality information comprises at least one of: type(s) of fluid contaminants in the fluid supply source, concentrations of the fluid contaminants, pH of the fluid supply source, turbidity of the fluid supply source, total suspended solids (TSS), total dissolved solids (TDS) in the fluid supply source, conductivity of effluent water and waste streams from the fluid treatment device and any combination thereof.

8. The method of claim 1, further comprising communicating a second alert signal to the at least one communication unit, the second alert signal being indicative of one or more of: a concentration of one or more fluid contaminants, and/or the pH of the fluid supply source, and/or the turbidity of the fluid supply source, and/or the total dissolved solids within the fluid supply source, conductivity of fluid treatment device effluent and waste streams and/or the total suspended solids within the fluid supply source, has reached a predetermined maximum threshold value.

9. The method of claim 1, further comprising communicating a third alert signal to the at least one communication unit, the third alert signal being indicative of the presence of at least one detrimental constituent within the fluid.

10. A fluid treatment management system for managing a fluid treatment arrangement comprising: a fluid supply source provided by an operator, at least one fluid outlet in fluid communication with and spaced downstream of the fluid supply source, in which the at least one fluid outlet provides fluid to an end user, and at least two point-of-use or entry fluid treatment devices located at or adjacent a corresponding fluid outlet, the first fluid treatment device being configured to remove a first contaminant from the fluid and the second fluid treatment device being configured to remove a second contaminant from the fluid, the first and second contaminants selected from the group consisting of arsenic, nitrates, and nitrites, the system comprising:

first sensing module located at a location at or between the fluid supply source and the point of supply of the fluid supply source, wherein the first sensing module is operable to obtain fluid quality information of the fluid supply source;

at least one second sensing module, wherein the or each second sensing module is located at or adjacent a corresponding fluid outlet, wherein the or each second sensing module is operable to obtain fluid output flow measurements of a corresponding fluid outlet;

a server arrangement communicably coupled to the first and at least one second sensing modules, wherein the server arrangement is operable to calculate each individual service point of the at least one point-of-use or entry fluid treatment device based on a rate of loss of fluid treatment efficiency of each of the at least one point-of-use or point-of-entry fluid treatment device and an operational lifetime impact of constituents within the fluid on each of the at least one point-of-use or point-of-entry fluid treatment devices;

at least one control module in communication with the server arrangement and a corresponding at least one fluid outlet, in which the server arrangement is operable to activate a control module to restrict fluid supply to, or to divert fluid supply away from, a corresponding point-of-use or point-of-entry fluid outlet when a predicted service point of the corresponding fluid treatment device has been reached; and at least one communication unit operable to communicate each individual predicted service event point of the at least one fluid treatment device to one or more of: the operator and/or the end user.

11. The fluid treatment management system of claim 10, wherein the server arrangement further comprises a first alert mechanism operable to further communicate a first alert signal to the at least one communication unit, the first alert signal being indicative that a fluid treatment device is approaching its individual predicted service point.

12. The fluid treatment management system of claim 10, further comprising at least one control module, in which each control module is in communication with the server arrangement and a corresponding at least one fluid outlet, in which the server arrangement is operable to activate a control module order to restrict fluid supply to and/or to divert fluid supply away from a corresponding fluid outlet when the corresponding predicted service point of the corresponding fluid treatment device has been reached.

13. The fluid treatment management system of claim 10, further comprising a calculation module operable to calculate individual service points of the at least one point-of-use or point-of-entry fluid treatment devices based on a record of collected historic fluid treatment performance data.

14. The fluid treatment management system of claim 10, wherein the server arrangement further comprises a second alert mechanism operable to further communicate a second alert signal to the at least one communication unit, the second alert signal being indicative that a fluid contamination level exceeds a predetermined maximum threshold fluid contamination level.

15. The fluid treatment management system of claim 10, wherein the server arrangement further comprises a third alert mechanism operable to further communicate a third alert signal to the at least one communication unit, the third alert signal being indicative of the presence of at least one detrimental constituent within the fluid.

* * * * *